3,674,476
PROCESS FOR PRODUCING PHOTOCONDUCTIVE LAYER FOR ELECTROPHOTOGRAPHY
Yasuo Tamai and Hajime Miyazuka, Asaka, Japan, assignors to Fuji Photo Film Co., Ltd., Kanagawa, Japan
No Drawing. Filed June 16, 1970, Ser. No. 46,826
Claims priority, application Japan, June 18, 1969, 44/47,624
Int. Cl. G03g 5/08
U.S. Cl. 96—1.8        6 Claims

ABSTRACT OF THE DISCLOSURE

A process of producing a photoconductive element for electrophotography which comprises heating zinc hydroxide or basic zinc carbonate in the presence of water and under elevated pressure to obtain zinc oxide, dispersing the zinc oxide into an appropriate insulating resin and applying the dispersion onto an electroconductive support material.

---

This invention relates to a process for producing photoconductive layer adapted for use as photosensitive material in electrophotography, and particularly to an electrophotographic photosensitive layer composed of a novel combination of photoconductive material and binder.

Zinc oxide which is widely used as photoconductive material for use in photosensitive layer for electrostatic or electrolytic electrophotography has been prepared by gaseous method (French process). Despite excellent photoconductive property thereof, zinc oxide prepared by said process involves fairly complicated process requiring raw materials of high purity and rigorous regulation, due to the nature of gaseous reaction and high temperature treatment involved therein.

As the result of investigation for a process of producing photoconductive zinc oxide without requiring treatment at a high temperature (higher than 800° C.) and even with reduced scale, the present inventors have succeeded to find a novel process which enables to obtain highly photoconductive zinc oxide powder employing a treatment at a relatively low temperature and without requiring any special raw materials of high purity.

According to this process photoconductive zinc oxide fine powder with homogeneous particle size can be obtained by heating zinc hydroxide or basic zinc carbonate in the presence of water and under elevated pressure.

It is already known that zinc hydroxide etc., when heated in air, decomposes to an amorphous product with regards to X-ray diffraction analysis, which can be converted into zinc oxide by heating at a higher temperature. Zinc oxide thus obtained shows, however, insufficiently low photoconductivity due to insufficient crystallization of zinc oxide when the treating temperature is low, while leads to larger particle size due to sintering of formed zinc oxide particles if said temperature is high. Also the process of treatment at high temperature in general leads to contamination of impurities, thus resulting in deteriorated photoconductivity. Furthermore sintered particles general require large amount of energy in dispersing and therefore are undesirable from industrial point of view.

The present inventors have succeeded, however, to obtain photoconductive zinc oxide fine powder of homogeneous particle size by means of so-called hydrothermal synthesis in which zinc hydroxide or basic zinc carbonate and have confirmed that thus obtained powder is suitable for use as photoconductive material in electrophotographic process.

The raw material to be employed in the process of this invention is zinc hydroxide or basic zinc carbonate which are characterized by decomposition at a relatively low temperature releasing water. Water thus released is capable of working as crystallization accelerator in case of formation of zinc oxide crystal from the product of said decomposition. This fact can be confirmed by the fact that formation of zinc oxide is scarcely observed by X-ray diffraction analysis when zinc hydroxide is heated at 180° C. for 1 hour in air while highly crystalline zinc oxide can be obtained when the heating is carried out at same temperature in an autoclave. Crystallinity is naturally improved when zinc hydroxide is heated together with neutral or weakly basic water in the autoclave, which are presumed to accelerate decomposition reaction of zinc hydroxide into zinc oxide and also to facilitate, working as solvent, the growth of zinc oxide crystal.

The autoclave treatment to be employed in the process of this invention does not require any particularly high temperature nor prolonged period, which, if employed, will adversely lead to larger particles. It is found that the treatment longer than 10 hours at a temperature higher than 350° C. is undesirable. For the purpose of this invention preferred conditions of treatment are found to be 0.5 to 5 hours at 180°–300° C. when water is added into the autoclave. As regards pressure, zinc oxide conforming to the purpose of this invention is found to be obtainable if the elevated internal pressure generated by heating exceeds 1.2 atm. Higher pressure is also acceptable, but excessively high pressure requires larger autoclave and therefore is not economical. The reaction period becomes generally shorter at higher temperature and higher pressure. The internal pressure of autoclave is determined as the function of temperature when raw material and water are charged in the autoclave, but can also be arbitrarily regulated by means of external pressurizing system or exhaust valve.

After the completion of autoclave treatment, the content is taken out, filtered and dried sufficiently at a temperature higher than 120° C. to obtain fine powder of zinc oxide provided with excellent photoconductivity.

The drying temperature after autoclave treatment is found to be an important factor in this process. An insufficient temperature leads to large dark-decay of surface potential in photosensitive layer prepared therefrom, thus resulting in insufficient developing density. Thus the drying under atmospheric pressure should preferably be carried out at a temperature higher than 120° C. Prolonged heating at 400° C. or higher should be prevented, however, since this will lead to the formation of larger particles.

According to the present invention, the photosensitive layer is prepared by blending thus obtained zinc oxide powder with binding material and applying thus obtained mixture onto an electroconductive support material. Said binding material consists of insulating resin, for example, vinyl chloride-vinyl acetate copolymer, styrene-butadiene copolymer, silicone resin, epoxyesters, alkyd resin, styrene modified alkyd resin, acryl resin etc., and is employed in an amount of 0.5 to 20 parts by weight, preferably 1 to 7 parts by weight with respect to 10 parts by weight of zinc oxide fine powder.

Further said photosensitive layer can be eventually added with plasticizer, inert pigment, lubricant, surface active agent in order to facilitate said application or photosensitizing dye in order to expand the photosensitive spectral range which originally covers from ultraviolet to blue. Also, the process of this invention enables addition of desired additives with satisfactory reproducibility due to small production scale thereof, thereby facilitating the control of various characteristics.

Further, the photoconductive zinc oxide obtained according to the present invention may be used in mixture with zinc oxide produced by French process.

This invention will be further clarified by the following examples.

EXAMPLE 1

20 g. of commercially available zinc hydroxide powder and 22 ml. of distilled water were placed in an autoclave with an internal volume of 35 ml., which was then heated in an electric furnace so as to realize an internal temperature of 250° C. The internal pressure amounted to 210 atm. After heating for 2 hours at this temperature, the autoclave was taken out from the electric furnace and allowed to cool in ambient temperature. The content of autoclave was centrifuged to obtain white powder, which was identified by X-ray diffractometry to be composed exclusively of zinc oxide with excellent crystallinity. According to electron microscopic investigation, the average particle size of zinc oxide was $0.6\mu$.

Zinc oxide thus obtained was successively washed and dried for 20 hours in a drying box kept at 120° C.

Preparation of photosensitive layer was realized by the following procedure:

A mixture of following composition was blended for 2 hours in a small agate ball mill.

| | |
|---|---|
| Zinc oxide obtained by the treatment explained above _____g__ | 10 |
| Styrene modified alkyd resin _____g__ | 2.5 |
| Cobalt naphthenate (cobalt content 10%) percent__ | 0.025 |
| Butyl acetate _____ml__ | 15 |
| Xylene _____ml__ | 8 |

Obtained white suspension was applied on paper previously subjected to electroconductive treatment so as to obtain a thickness of $5\mu$ in dried state, and then dried for 6 hours in a drying box kept at 40° C. Thus completed photosensitive layer was subjected, after placed in a dark place for a sufficiently long period, to negative corona discharge of $-7$ kv. thereby to obtain surface potential of $-120$ volts, then subjected to imagewise exposure of original positive pattern with light intensity of 5000 lux for 1 second and developed with liquid developers containing positively charged toners, thereby to obtain reproduction of original positive pattern.

EXAMPLE 2

20 g. of basic zinc carbonate and 20 ml. of distilled water were placed in an autoclave with an internal volume of 35 ml., which was then heated so as to realize an internal temperature of 300° C. The internal pressure at this stage amounted to 240 atm. After heating for 1.5 hours, the autoclave was taken out from electric furnace and allowed to cool in ambient temperature. By this procedure obtained was pale yellow zinc oxide of sufficient crystallinity, which was then made into photosensitive layer according to the similar procedure as shown in Example 1. Said layer was subjected to negative corona discharge of $-7$ kv. to obtain a surface potential of $-85$ v. Positive reproduction was obtained by successive steps of imagewise exposure and developing.

EXAMPLE 3

Aqueous solution of sodium hydroxide saturated at room temperature was heated up to just before boiling and commercially available E.P. grade zinc oxide was added until saturation thereby to obtain a concentrated solution of sodium zincate. Then this solution was cooled, added with abundant water when the temperature became 100° C. and allowed to stand for 3 days thus to obtain zinc hydroxide with satisfactory crystallinity. 10 g. of thus obtained zinc hydroxide and 30 ml. of distilled water were placed in an autoclave with an internal volume of 35 ml., which was then heated so as to maintain the interior at 250° C. and 300 atm. for 2 hours. Photosensitive layer prepared showed a surface potential of only $-40$ v. when the drying of zinc oxide was carried out for 12 hours at 100° C., while showed a surface potential of $-125$ v. when the drying was carried out at 160° C. for 12 hours.

EXAMPLE 4

20 g. of zinc hydroxide prepared in Example 3 was placed in an autoclave and heated at 250° C. for 15 hours. In this case the internal pressure of 2.2 atm. White zinc oxide powder obtained after cooling, was dried and made into a photosensitive layer by a similar procedure as shown in Example 1. When subjected to negative corona discharge, the photosensitive layer thus prepared showed a surface potential of $-105$ volts. Reproduced image of excellent quality was obtained by the successive steps imagewise exposure and developing.

What is claimed is:

1. A process of producing photoconductive element for electrophotography which comprises heating in a closed system zinc hydroxide or basic zinc carbonate at a minimum temperature of 180° C. in the presence of water and under an elevated pressure of at least 1.2 atmospheres for a period of time sufficient to obtain a mixture comprising photoconductive zinc oxide, removing the zinc oxide from said mixture, drying the removed zinc oxide in the temperature range of 120°–400° C. to obtain fine powders of zinc oxide, dispersing said zinc oxide powder into an insulating resin which is employed in an amount of 0.5 to 20 parts by weight of the zinc oxide and applying the thus prepared dispersion onto an electroconductive support material.

2. The process according to claim 1, wherein said heating is carried out in an autoclave.

3. The process according to claim 1, wherein said insulating resin is used in an amount of 1 to 7 parts by weight with respect to 10 parts by weight of zinc oxide.

4. A process as in claim 1 where the temperature at which said zinc hydroxide or basic zinc carbonate is heated is no greater than 350° C.

5. A process as in claim 4 where the temperature range at which said zinc hydroxide or zinc carbonate is heated is 180°–300° C. and the period of time is 0.5 to 5 hours.

6. A process of producing photoconductive zinc oxide which comprises heating in a closed system zinc hydroxide or basic zinc carbonate at a minimum temperature of 180° C. in the presence of water and under an elevated pressure of at least 1.2 atmospheres for a period of time sufficient to obtain a mixture comprising photoconductive zinc oxide, removing the zinc oxide from said mixture, and drying the removed zinc oxide in the temperature range of 120°–400° C. to obtain fine powders of zinc oxide.

References Cited

UNITED STATES PATENTS

| | | | |
|---|---|---|---|
| 3,052,539 | 9/1962 | Greig | 106—296 X |
| 3,429,662 | 2/1969 | Klein et al. | 96—1.8 X |
| 2,941,862 | 6/1960 | Cyr et al. | 23—148 |
| 2,990,279 | 6/1961 | Crumley et al. | 96—1.8 |
| 3,264,229 | 8/1966 | Klein | 252—501 X |
| 3,467,497 | 9/1969 | Weisbeck et al. | 23—148 |
| 2,727,808 | 12/1955 | Thomsen | 23—147 |

CHARLES E. VAN HORN, Primary Examiner

U.S. Cl. X.R.

252—501; 117—34; 106—296; 23—148